United States Patent
Saxena et al.

(10) Patent No.: US 10,482,323 B2
(45) Date of Patent: Nov. 19, 2019

(54) SYSTEM AND METHOD FOR SEMANTIC TEXTUAL INFORMATION RECOGNITION

(71) Applicant: AUTONOM8 INC, Saratoga, CA (US)

(72) Inventors: Paresh Saxena, Bangalore (IN); Ranjit Padmanabhan, Saratoga, CA (US)

(73) Assignee: Autonom8, Inc., Saratoga, CA (US)

( * ) Notice: Subject to any disclaimer, the term of this patent is extended or adjusted under 35 U.S.C. 154(b) by 176 days.

(21) Appl. No.: 15/682,808

(22) Filed: Aug. 22, 2017

(65) Prior Publication Data

US 2019/0065840 A1 Feb. 28, 2019

(51) Int. Cl.
*G06K 9/00* (2006.01)
*G06K 9/46* (2006.01)
*G06N 3/08* (2006.01)

(52) U.S. Cl.
CPC ........... *G06K 9/00409* (2013.01); *G06K 9/46* (2013.01); *G06N 3/08* (2013.01)

(58) Field of Classification Search
CPC .......... G06K 9/00463; G06K 2209/01; G06K 9/00442; G06K 9/344; G06K 9/00456; G06K 9/2054; G06K 9/723
See application file for complete search history.

(56) References Cited

U.S. PATENT DOCUMENTS

| | | | |
|---|---|---|---|
| 5,628,003 A | 5/1997 | Fujisawa et al. | |
| 5,907,631 A | 5/1999 | Saitoh | |
| 7,499,588 B2 | 3/2009 | Jacobs et al. | |
| 9,530,069 B2 | 12/2016 | Manmatha et al. | |
| 10,108,695 B1* | 10/2018 | Yeturu | G06F 16/285 |
| 2006/0282442 A1* | 12/2006 | Lennon | G06K 9/00442 |
| 2007/0250497 A1* | 10/2007 | Mansfield | G06F 16/36 |
| 2008/0040660 A1* | 2/2008 | Georke | G06K 9/00442 715/243 |
| 2009/0144277 A1* | 6/2009 | Trutner | G06F 17/2241 |
| 2010/0284623 A1* | 11/2010 | Chen | G06K 9/00463 382/224 |
| 2011/0228124 A1* | 9/2011 | Ahn | G06K 9/3283 348/222.1 |
| 2015/0206031 A1* | 7/2015 | Lindsay | G06F 16/35 382/218 |
| 2016/0092730 A1* | 3/2016 | Smirnov | G06K 9/00456 382/195 |
| 2016/0217119 A1* | 7/2016 | Dakin | G06F 17/243 |

(Continued)

*Primary Examiner* — Li Liu

(57) ABSTRACT

A semantic textual information recognition system is provided. The system includes a memory configured to receive a plurality of text elements along with respective text element coordinates. The system includes a processor operatively coupled to the memory, wherein the processor includes a spatial reconstruction module configured to identify the plurality of text elements on an information axis based on the text element coordinates. The processor also includes a semantic clustering module configured to determine a plurality of semantic clusters of the plurality of text elements by calculating a proximity matrix using the plurality of text elements on the same information axis and a semantic data model. The processor further includes a rank clustering module configured to generate a plurality of rank clusters by ranking the plurality of semantic clusters. The processor further includes a machine learning module configured to update the semantic data model based on the feature set.

12 Claims, 2 Drawing Sheets

(56) References Cited

U.S. PATENT DOCUMENTS

| | | | |
|---|---|---|---|
| 2017/0075877 A1* | 3/2017 | Lepeltier | G06F 17/2705 |
| 2017/0169103 A1* | 6/2017 | Juneja | G06N 7/005 |
| 2019/0026550 A1* | 1/2019 | Yang | G06K 9/00463 |
| 2019/0050639 A1* | 2/2019 | Ast | G06N 20/00 |

\* cited by examiner

SYSTEM AND METHOD FOR SEMANTIC TEXTUAL INFORMATION RECOGNITION

BACKGROUND

Embodiments of the present disclosure relate to image processing, and more particularly to, a system and method for semantic textual information recognition.

Documents are defined as a collection of primitive elements that are drawn on a page at defined locations. The content of the document is saved in various formats. Such heterogeneous nature of document content can present challenges when various elements need to be extracted, edited, combined or processed.

A user can view the content of the document on a document viewing device. Such a document viewing device has no knowledge of the intended structure of the document. For example, a table is displayed as a series of lines and/or rectangles with text between lines, which the human viewer recognizes as a table. However, the document viewing device displaying the document has no indication that the text groupings have relationships to each other. Such lack of knowledge creates a problem while analysing the document using machines or automated means.

Hence, there is a need for an improved & reliable automated system for semantic textual information recognition to address the aforementioned issues.

BRIEF DESCRIPTION

In accordance with one embodiment of the disclosure, a system and a method for semantic textual information recognition is provided. The system for semantic textual information recognition includes a processor operatively coupled with the memory configured to receive a plurality of text elements along with respective text element coordinates, wherein the processor includes a spatial reconstruction module configured to identify the plurality of text elements on an information axis based on the text element coordinates. The processor also includes a semantic clustering module configured to determine a plurality of semantic clusters of the plurality of text elements using the plurality of text elements on the same information axis and a semantic data model. The processor further includes a rank clustering module configured to generate a plurality of rank clusters by ranking the plurality of semantic clusters based on one or more heuristic rules of the semantic data model. The processor further includes a machine learning module configured to update the semantic data model based on the feature set. The system for semantic textual information recognition also includes a memory configured to store instructions and results.

In accordance with another embodiment of the present disclosure, a method for semantic textual information recognition is provided. The method for semantic textual information recognition includes receiving a plurality of text elements along with respective text element coordinates. The method for semantic textual information recognition also includes identifying the plurality of text elements on an information axis based on the text element coordinates. The method for semantic textual information recognition further includes determining a plurality of semantic clusters of the plurality of text elements using the plurality of text elements on the same information axis and a semantic data model. The method for semantic textual information recognition further includes generating a plurality of rank clusters by ranking the plurality of semantic clusters based on one or more heuristic rules of the semantic data model. The method for semantic textual information recognition further includes generating a feature set of the plurality of text elements on the same information axis, the plurality of semantic clusters and the plurality of rank clusters. The method for semantic textual information recognition further includes updating the semantic data model based on the feature set.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION

Embodiments of the present disclosure relate to a system and method for semantic textual information recognition. The system for semantic textual information recognition includes a processor operatively coupled with the memory configured to receive a plurality of text elements along with respective text element coordinates, wherein the processor includes a spatial reconstruction module configured to identify the plurality of text elements on an information axis based on the text element coordinates. The processor also includes a semantic clustering module configured to determine a plurality of semantic clusters of the plurality of text elements using the plurality of text elements on the same information axis and a semantic data model. The processor further includes a rank clustering module configured to generate a plurality of rank clusters by ranking the plurality of semantic clusters based on one or more heuristic rules of the semantic data model. The processor further includes a machine learning module configured to update the semantic data model based on the feature set. The system for semantic textual information recognition also includes a memory configured to store instructions and results.

In the following specification and the claims, reference will be made to a number of terms, which shall be defined to have the following meanings. The singular forms "a", "an", and "the" include plural references unless the context clearly dictates otherwise.

Figure 1:
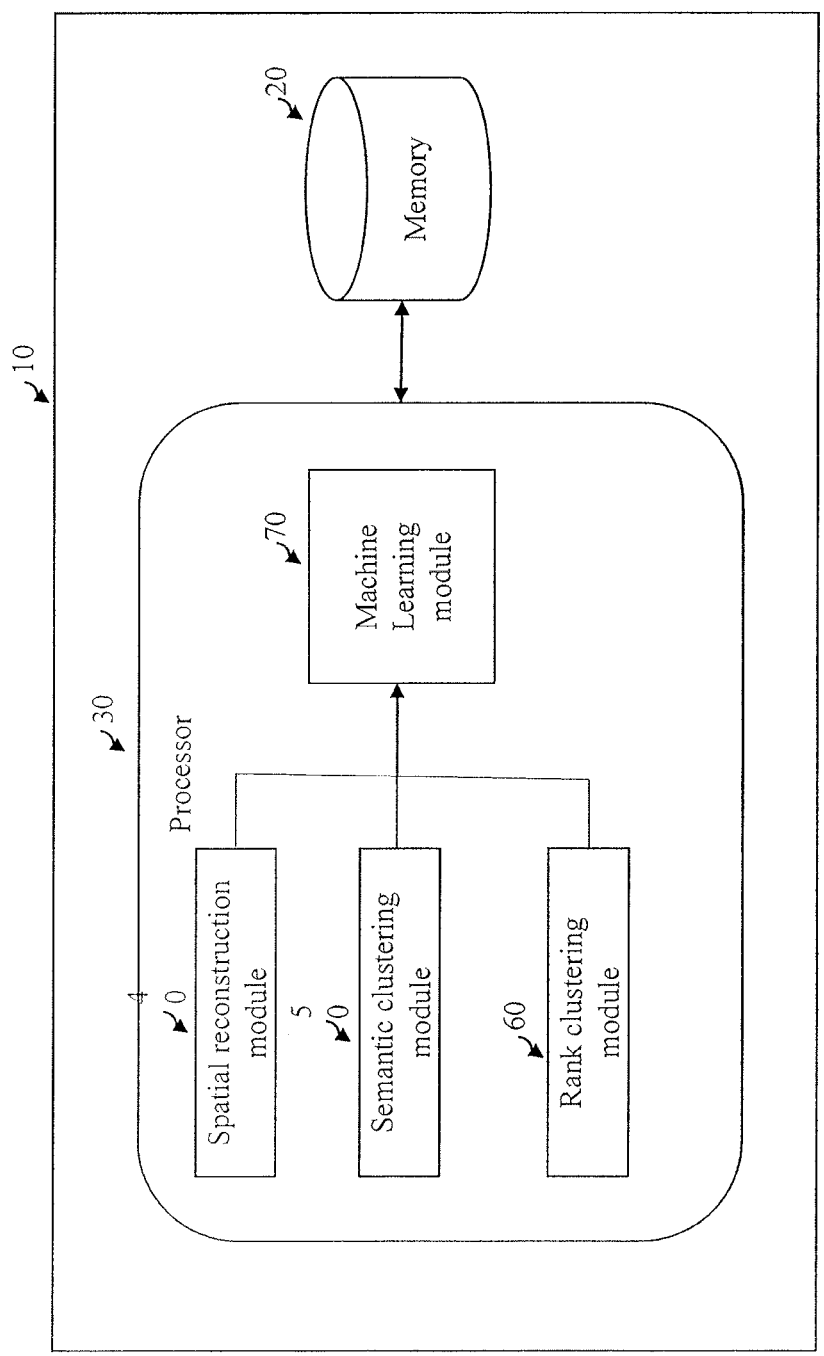
FIG. 1 illustrates a block diagram of a semantic textual information recognition system in accordance with an embodiment of the present disclosure.

FIG. 1 illustrates a block diagram of a semantic textual information recognition system in accordance with an embodiment of the present disclosure. The system 10 for semantic textual information recognition includes a memory 20 configured to store instructions and results. The system 10 for semantic textual information recognition also includes a processor 30 operatively coupled with the memory 20 configured to receive a plurality of text elements along with respective text element coordinates, wherein the processor 30 includes a spatial reconstruction module 40 configured to identify the plurality of text elements on an information axis based on the text element coordinates. The processor 30 also includes a semantic clustering module 50 configured to determine a plurality of semantic clusters of the plurality of text elements using the plurality of text elements on the same information axis and a semantic data model. The processor 30 further includes a rank clustering module 60 configured to generate a plurality of rank clusters by ranking the plurality of semantic clusters based on one or more heuristic rules of the semantic data model. The processor 30 further includes a machine learning module 70 configured to update the semantic data model based on the feature set.

In one embodiment, the system 10 includes at least one optical recognition system configured to extract the plurality of text elements with respective text element coordinates from a file. In another embodiment, the one or more optical recognition system may include an optical character recognition, an optical word recognition or a combination thereof. In one embodiment, the plurality of text elements coordinates includes coordinates of a bounding polygon.

The plurality of text elements are extracted from the file. The file may include an image file or a text file. In one embodiment, the file may be a semi-structured image, a scanned document, a photo of a document, a scene-photo or from subtitle text superimposed on an image. In a specific embodiment, the file may include a pay check for compensation information, a stock report for financial data, an ID card for contact details or a bank statement for expenses.

The processor 30 includes a spatial reconstruction module 40 configured to identify the plurality of text elements on an information axis based on the text element coordinates. In one embodiment, the spatial reconstruction module 40 is configured to sort the plurality of text elements along the information axis with respect to text element coordinates.

The processor 30 also includes a semantic clustering module 50 configured to determine a plurality of semantic clusters of the plurality of text elements using the plurality of text elements on the same information axis and a semantic data model. In one embodiment, the semantic clustering module 50 is configured to calculate a proximity matrix using the plurality of text elements on the same information axis and the semantic data model.

The processor 30 further includes a rank clustering module 60 configured to generate a plurality of rank clusters by ranking the plurality of semantic clusters based on one or more heuristic rules of the semantic data model. In one embodiment, the rank clustering module 60 is configured to generating the plurality of rank clusters based on a probabilistic ranking method.

The machine learning module 70 includes any supervised machine learning module configured to update the semantic data model based on the feature set. In one embodiment, the machine learning module 70 may include a random decision forests module, a deep learning module or a combination thereof. In another embodiment, the machine learning module 70 is configured to search predefined information from the file. In yet another embodiment, the machine learning module 70 is configured to classify the files type such as whether the file may be a bank statement or a paycheck or a receipt or the like.

The memory 20 may include one or more dictionaries to represent a domain of the file being parsed. For example, if a pay check is being parsed then the dictionary would include words such as salary, tax or allowance. In one embodiment, synonyms of various words are designated as canonical in the one or more dictionaries. In another embodiment, the memory 20 may further include data related to the file being parsed such as company names and other data.

Figure 2:
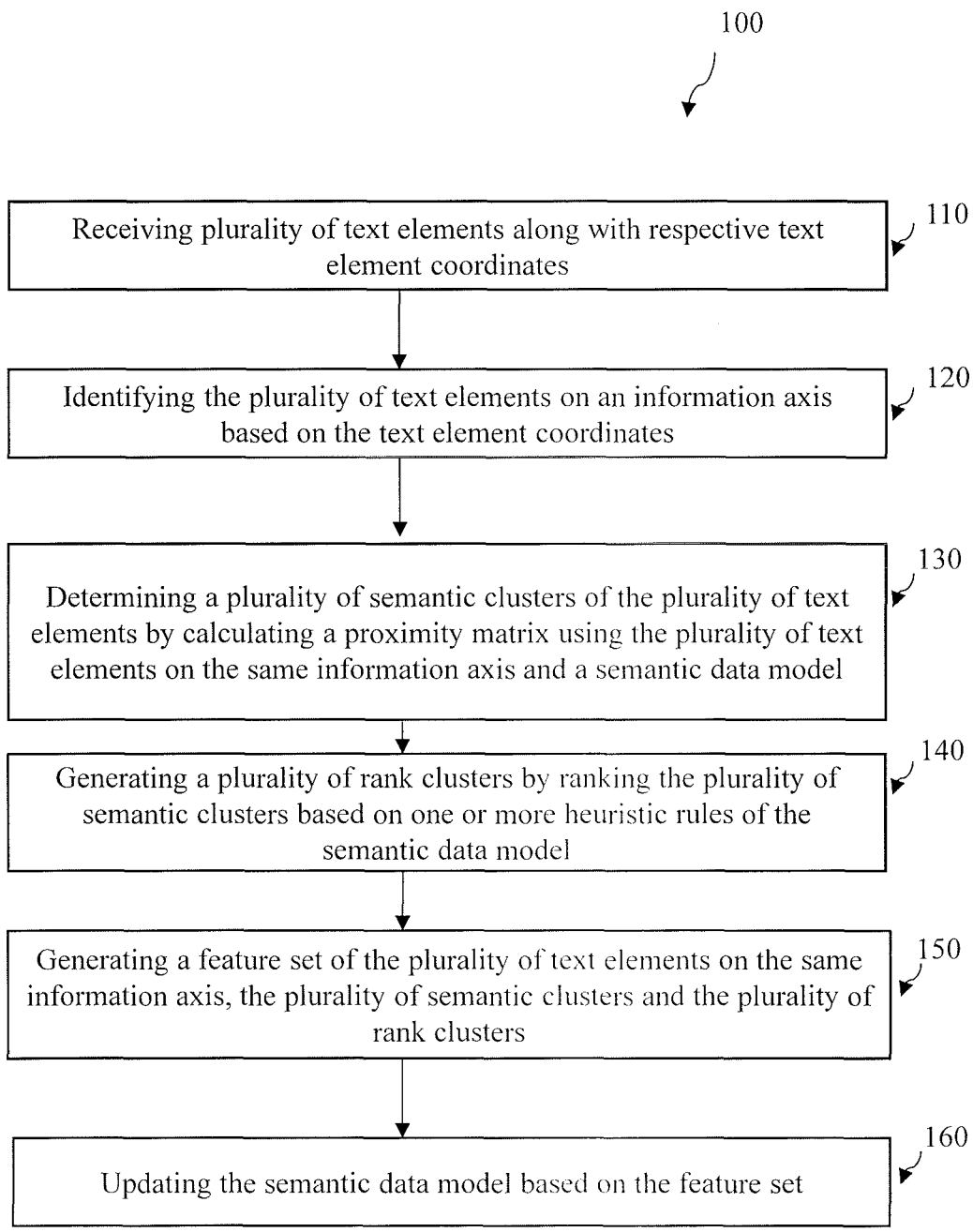
FIG. 2 illustrates a process flow diagram of a semantic textual information recognition system in accordance with an embodiment of the present disclosure.

FIG. 2 illustrates a process flow diagram of a semantic textual information recognition system in accordance with an embodiment of the present disclosure. The method 100 for semantic textual information recognition includes receiving a plurality of text elements along with respective text element coordinates in step 110. The method 100 for semantic textual information recognition also includes identifying the plurality of text elements on an information axis based on the text element coordinates in step 120. In one embodiment, identifying the plurality of text elements on an information axis based on the text element coordinates may include sorting the plurality of text elements along the information axis with respect to text element coordinates. As used herein, the term "information axis" may be defined as a linear or non-linear axis along which semantic information may be located. Such linear or non-linear axis may include a row or a column, or an axis at an angle based on an orientation of the file.

In another embodiment, identifying the plurality of text elements on the information axis includes identifying the plurality of text elements on the information axis based on a cubic spline method or a linear extrapolation method. In a specific embodiment, the linear extrapolation method may apply on scanned document images.

The method 100 for semantic textual information recognition further includes determining a plurality of semantic clusters of the plurality of text elements using the plurality of text elements on the same information axis and a semantic data model in step 130. In one embodiment, determining the plurality of semantic clusters of the plurality of text elements using the plurality of text elements on the same information axis and the semantic data model includes calculating a proximity matrix using the plurality of text elements on the same information axis and the semantic data model.

In one embodiment, stochastic neighbourhood embedding or other embedding methods may be used for semantic clustering of the plurality of text elements.

In one embodiment, a proximity vector in the proximity matrix is adjusted for determining the curvature of the file for distance adjustments. In another embodiment, the proximity vector in the proximity matrix is adjusted for varying lighting to contrast adjustment. In yet another embodiment, the proximity vector in the proximity matrix is adjusted for adjusting a slope of the bounding polygon. The slope of the bounding polygon may be used to determine the orientation of the file for angular adjustments.

In one embodiment, the proximity matrix includes a relationship between a Euclidean distance between the plurality of text elements and information retrieved from the semantic data model. In yet another embodiment, the Euclidean distance include a distance between each text element in the plurality of text elements.

In a specific embodiment, non-Euclidean distances may be used as a similarity measure for computing the proximity matrix. In one embodiment, Kernel methods may be used to evaluate a covariance function for the purpose of defining similarity between the plurality of text elements. The covariance function may further be used to create the plurality of semantic clusters.

In another embodiment, the kernel methods may include a support vector machine method or a Gaussian process or a combination thereof. In yet another embodiment, computing standard deviation of proximity matrix and replace the Euclidean distance in the proximity matrix with the Gaussian kernel distances. The Gaussian kernel distances calculated by equation:

$$k_{i,j} = \exp(-d_{i,j}/(2*\sigma^2));$$

where, $k_{i,j}$ is Gaussian kernel distances;
$d_{i,j}$ is the distance in row 'i' and column 'j'
exp is an exponential function; and
σ is standard deviation.

In some embodiment, a z-score of the highest two Gaussian kernel distance metrics for the plurality of text elements may be calculated to determine which two text elements may be considered as a part of same semantic cluster.

The method 100 for semantic textual information recognition further includes generating a plurality of rank clusters by ranking the plurality of semantic clusters based on one or more heuristic rules of the semantic data model in step 140. In one embodiment, generating the plurality of rank clusters by ranking the plurality of semantic clusters based on one or more heuristic rules of the semantic data model may include generating the plurality of rank clusters based on a probabilistic ranking method.

In another embodiment, generating the plurality of rank clusters by ranking the plurality of semantic clusters based on one or more heuristic rules of the semantic data model may include generating the plurality of rank clusters based on Jaro-Winkler distance, Levenshtein distance or longest common subsequence distance.

The method 100 for semantic textual information recognition further includes generating a feature set of the plurality of text elements on the same information axis, the plurality of semantic clusters and the plurality of rank clusters in step 150.

The method 100 for semantic textual information recognition further includes updating the semantic data model based on the feature set in step 160. In one embodiment, updating the semantic data model based on the feature set by applying the feature set of the plurality of text elements to the supervised machine learning module.

The system and method for semantic textual information recognition is advantageous as the system has the knowledge of the intended structure of the document. The plurality of text elements of the file are identified and encoded as such in the order in which the plurality of text elements are written. The system and method for semantic textual information recognition indicates that the text groupings have relationships to each other. While editing a table in the file, the system automatically identifies the relation of the plurality of text elements with rows and/or columns of the table.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

We claim:

1. A method for semantic textual information recognition comprising:
   receiving a plurality of text elements along with respective text element coordinates;
   identifying the plurality of text elements on an information axis based on the respective text element coordinates;
   determining a plurality of semantic clusters of the plurality of text elements by calculating a proximity matrix using the plurality of text elements on the same information axis and a semantic data model;
   generating a plurality of rank clusters by ranking the plurality of semantic clusters based on one or more heuristic rules of the semantic data model;
   generating a feature set of the plurality of text elements on the same information axis, the plurality of semantic clusters and the plurality of rank clusters; and
   updating the semantic data model based on the feature set.

2. The method as claimed in claim 1, wherein identifying the plurality of text elements on the information axis based on the text element coordinates comprises sorting the plurality of text elements along the information axis with respect to text element coordinates.

3. The method as claimed in claim 1, wherein identifying the plurality of text elements on the information axis comprises identifying the plurality of text elements on the information axis based on a cubic spline method or a linear extrapolation method.

4. The method as claimed in claim 1, wherein the proximity matrix comprises a relationship between a Euclidean distance between the plurality of text elements and information retrieved from the semantic data model.

5. The method as claimed in claim 4, wherein the Euclidean distance comprises a distance between two text elements in the plurality of text elements.

6. The method as claimed in claim 1, wherein generating the plurality of rank clusters by ranking the plurality of semantic clusters based on the one or more heuristic rules of the semantic data model comprises generating the plurality of rank clusters based on a probabilistic ranking method.

7. The method as claimed in claim 1, wherein generating the plurality of rank clusters by ranking the plurality of semantic clusters based on the one or more heuristic rules of the semantic data model comprises generating the plurality of rank clusters based on Jaro-Winkler distance, Levenshtein distance or longest common subsequence distance.

8. A system for semantic textual information recognition from document images comprising:
   a memory configured to store instructions and results;
   a processor operatively coupled with the memory configured to receive a plurality of text elements along with respective text element coordinates, wherein the processor comprises:
   a spatial reconstruction module configured to identify the plurality of text elements on an information axis based on the respective text element coordinates;
   a semantic clustering module configured to determine a plurality of semantic clusters of the plurality of text elements by calculating a proximity matrix using the plurality of text elements on the same information axis and a semantic data model;
   a rank clustering module configured to generate a plurality of rank clusters by ranking the plurality of semantic clusters based on one or more heuristic rules of the semantic data model;
   a machine learning module configured to:

generate a feature set of the plurality of text elements on the same information axis, the plurality of semantic clusters and the plurality of rank clusters; and update the semantic data model based on the feature set.

9. The system as claimed in claim 8, further comprising at least one optical recognition system configured to extract the plurality of text elements with the respective text element coordinates from a file.

10. The system as claimed in claim 9, wherein the file comprises an image file or a text file.

11. The system as claimed in claim 9, further comprising one or more dictionaries to represent a domain of the file being parsed.

12. The system as claimed in claim 8, wherein the respective text elements coordinates comprises coordinates of a bounding polygon.

* * * * *